Aug. 23, 1960 C. J. WHEELER 2,949,669
APPARATUS FOR PARTING A FRACTURABLE MEMBER
Filed Sept. 2, 1958 2 Sheets-Sheet 1

INVENTOR
CHARLES J. WHEELER
BY C. T. Cross
ATTORNEY

Aug. 23, 1960  C. J. WHEELER  2,949,669
APPARATUS FOR PARTING A FRACTURABLE MEMBER
Filed Sept. 2, 1958  2 Sheets-Sheet 2

INVENTOR
CHARLES J. WHEELER
BY C. T. Cross
ATTORNEY

United States Patent Office 2,949,669
Patented Aug. 23, 1960

2,949,669
APPARATUS FOR PARTING A FRACTURABLE MEMBER

Charles J. Wheeler, 2048 W. Jackson St., Mentor, Ohio

Filed Sept. 2, 1958, Ser. No. 758,392

3 Claims. (Cl. 30—92)

This invention relates to the cutting of hollow articles, and more particularly relates to a new and improved apparatus and method for cutting hollow articles.

This invention is a continuation-in-part of my prior application Serial Number 578,208, filed April 16, 1956, and constitutes an improvement thereon.

Up to the present time, the cutting of relatively brittle hollow articles, especially cylindrical or tubular articles as well as hollow articles of oval or rectangular cross section such as various types of conduits or pipes, notably cast iron pipe, frequently has been a difficult and time-consuming operation. Cast iron pipe is typical of a hollow article which has heretofore been especially difficult to cut quickly and accurately. For that reason, cast iron pipe is particularly referred to throughout the specification and claims as illustrative of material to be cut although it is to be understood that the practice of this invention, while especially advantageous in the cutting of cast iron pipe is not limited thereto, but is concerned with the cutting of diverse types of hollow articles such as 4 to 15 inch diameter cast iron soil pipe, AWWA water main, tile, chimney flue liners, clay pipe, concrete pipe, terra cotta pipe, Transite pipe, or the like, whether of circular, oval or other cross-sectional shape.

Cutting of cast iron pipe heretofore has generally involved the use of hack saws, cold chisels and/or cutting apparatus rotatable or oscillatable about the pipe to effect cutting thereof. While, in some instances, these prior techniques may be satisfactory, certain difficulties generally characterize each of these procedures which render their use disadvantageous in many applications. The use of metal cutting torches also has been employed but there are limitations, too, in the use of such a technique.

The use of both manually operated and power hack saws, while undoubtedly affording means of cutting pipe accurately, generally is slow and relatively costly since the saw blade life often is relatively short. Moreover, it will be appreciated that, at times, the use of a power hack saw is either impracticable or impossible. In addition, where pipe installation is being carried out in construction work, serious space limitations occasionally are encountered which render the use of any type saw difficult. The use of chisels in the cutting of pipe frequently leads to relatively inaccurate and slow cutting. In addition, as with the use of saws, space limitations at times also impose restrictions on the use of chisels or other similar cutting devices.

Perhaps one of the most common types of pipe cutter employed up to this time has been one embodying a device adapted to be rotated or oscillated about the pipe during the cutting operation. While such devices offer certain advantages over other prior means of cutting pipe, these rotatable or oscillatable cutters have not provided a completely satisfactory solution to the problem of accurately and quickly cutting pipe, especially under conditions where cutting time, cost and space limitations are additional factors to be considered.

There is described and claimed in my above-mentioned pending application a new and useful cutter employing a cutter chain and pressure-applying means comprising a pressure clamp, which cutter avoids the difficulties in cutting pipe characterizing prior rotary or oscillatable cutters as well as the problems heretofore associated with the use of saws, chisels and metal-cutting torches. While the apparatus described and claimed in my said copending application provides a singular advance over the art, and while perfectly satisfactory operation is obtained in cutting hollow articles of varying shapes and sizes, it has been found that in some instances in cutting extremely large pipe and/or in situations where little access space is available immediately adjacent the pipe to be cut some difficulty is encountered in manipulating mechanical pressure clamps such as a compound leverage pressure clamp of suitable proportions to provide the necessary pressure. The present invention comprises an improved cutter which facilitates cutting of extremely large and/or strong hollow objects and permits use of the cutter in substantially any application wherein lack of access space heretofore has been troublesome.

Accordingly, the principal object of this invention is to avoid the difficulties heretofore encountered, to provide a new and improved cutter for pipe or other hollow articles and adapted to provide a large range of cutting pressures.

A further object of the invention is the provision of new and improved method and hydraulic apparatus for cutting hollow articles, notably pipe.

These and other objects and advantages of the invention will more fully appear from the following description thereof.

Briefly, the invention described and claimed in my above-mentioned pending application is based upon the discovery that a hollow article, especially one formed of relatively brittle materials, e.g., cast iron pipe, can readily and accurately be cut by applying linearly-concentrated, radially-directed, squeeze cut pressure at points substantially uniformly circumferentially distributed to the article sufficient to effect cutting thereof, without rotation or oscillation of the cutter about the article to be cut. The practice of that invention has proved to be especially advantageous with respect to relatively brittle articles such as cast iron pipe, hollow tile, and the like. Surprisingly, cutting properly effected in accordance with my invention does not cause shattering, cracking or other injury to the article being cut. Moreover, it will be appreciated that the practice of my invention does not involve rotation or oscillation of apparatus about the pipe or other article being cut, but, on the contrary, provides a direct, rapid, accurate means of cutting hollow articles formed of cast iron and other materials.

The present invention comprises a method and a cutter for hollow articles having, in combination, a flexible, non-extensible cutter chain adapted to be placed around an article to be cut and to apply linearly-concentrated, radially-directed, article-cutting pressure to the circumference at equally-spaced points circumferentially, without rotation or oscillation thereabout, and hydraulic pressure-applying means operatively-connected to said chain.

Thus, it will be appreciated that apparatus of this invention includes a non-extensible cutter chain preferably containing a plurality of spaced, uniformly circumferentially distributed cutter edges, and hydraulic means to apply tension and hence radially-directed pressure when disposed about an article to be cut.

At present, it is preferred to utilize a pressure clamp with two pivotally-connected jaws adapted to engage the cutter chain, e.g., with the two jaws of the clamp, and by movement of the jaws to effect the application of tension to said chain while disposed about the pipe or other article to be cut, thus imparting a concentrated, pipe-constricting, squeeze-cutting pressure sufficient to cut the pipe. A specifically preferred hydraulic means for applying pressure to the cutter edges comprises a hydraulically-operated pressure piston and cylinder operatively-connected to said jaws at or adjacent the ends opposite the chain-engaging portion of said jaws, said piston and cylinder constituting a hydraulic actuator which is in fluid pressure connection with a hydraulic pump, this system being capable of transmitting a highly magnified pressure to the cutter chain. Such a device includes chain-engaging means to engage the cutter chain at points spaced a distance along the chain dictated by the size, i.e., circumference, of the article to be cut, a hydraulic pump operatively-connected through a hydraulic fluid circuit to said chain-engaging means whereby application of pressure to the pump simultaneously applies a magnified cutting pressure to said chain-engaging means, thus tightening the cutter chain around the article to be cut.

A more specific embodiment of the invention comprises a flexible, non-extensible cutter chain engageable at spaced points by chain-engaging means movable to tighten the chain around the article to be cut in response to hydraulic pressure greatly magnified over that applied and provided by apparatus comprising, in combination, a hydraulic pump including a first piston movably disposed in a first cylinder operatively-connected to a second piston of substantially increased cross-section disposed in a second cylinder, said second piston operatively applying fluid pressure to said chain-engaging means when disposed about the article to be cut. The two pistons and cylinders and operative fluid connection therebetween may comprise a single unitary structure wherein the pump and pressure-applying piston are embodied in a single apparatus element as in the case of the hydraulic pressure-applying elements shown in U.S. Patent No. 2,821,877—Swanson.

Alternatively and preferably, the hydraulic pressure-applying means comprises a hydraulic pump such as a hand or foot-operated, or power operated, pump capable of applying the necessary pressure, e.g. a No. 1715 hydraulic hand pump (Greenlee) or an electrically-operated hydraulic pump such as the Blackhawk Porto-Power, high pressure hydraulic pump, Model P2, manufactured by the Black Hawk Manufacturing Company. Other types of hydraulic pumps of smaller or larger sizes also may be used, e.g., as shown in Catalog K of the Strong, Carlisle & Hammond Company, pages 979, 980, 400, 76 and 85.

When a separate hydraulic pump is used, for example, a commercially available hydraulic pump of the type indicated, the second hydraulic element comprises a piston of increased cross-sectional area operatively-disposed in a cylinder, thus constituting a hydraulic actuator, with a pressure-resistant fluid circuit between the pump and hydraulic element as provided by a flexible, pressure-resistant hose of any convenient length, e.g., several feet, typically 4 to 8 feet. Such a length permits positioning the hydraulic pump away from the immediate situs of cutting in a convenient manner for operation yet permits application of cutting pressure where it is desired. Typical of suitable hose is Blackhawk Porto-Power hose resistant to 10,000 p.s.i. or greater internal pressure. Such hose generally is employed with protective metal guards adjacent its ends.

The chain-engaging means may take various forms and may be incorporated as part of the hydraulic pump or elsewhere in the hydraulic circuit. A presently-preferred embodiment of the invention comprises a pressure clamp to which pressure is applied by hydraulic means described. More specifically preferred is a pair of heavy duty clamp jaws pivotally-connected intermediate their ends with one end of the jaws adapted to engage the cutter chain while at, or adjacent, the other end is provided with means operatively to engage a hydraulic actuator whereby movement of the actuator under the influence of hydraulic pressure applied by the pump connected thereto provides the substantial and greatly-magnified pressure necessary to cut the hollow article. It will be appreciated that by properly proportioning the hydraulic elements with due consideration to the strength of the materials used, any desired increase in pressure for cutting can be provided.

Reference is now made to the accompanying drawings which illustrate various embodiments of the apparatus of this invention.

Figure 1:
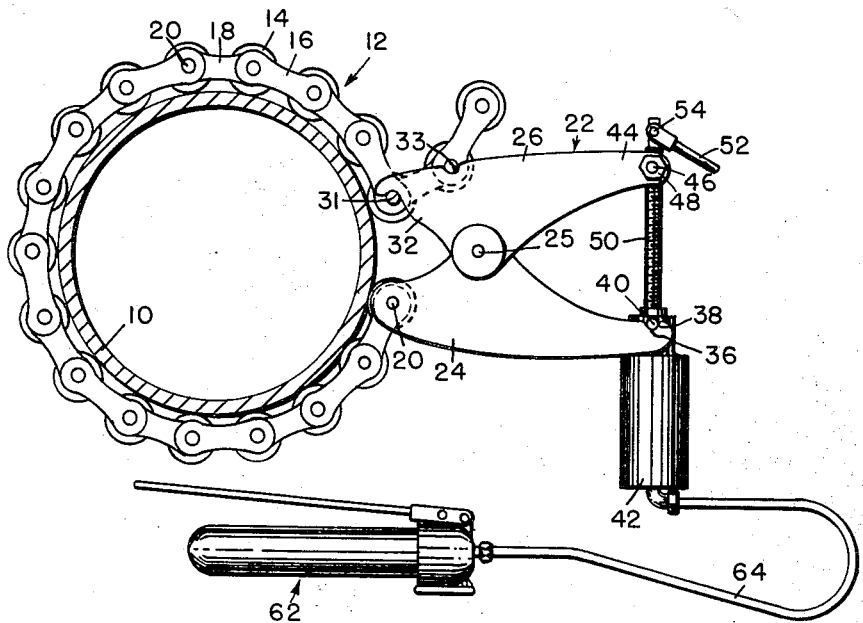
Fig. 1 is a fragmentary view, partially in section, of a hydraulic cutter embodying the invention in position for cutting.
Figure 2:
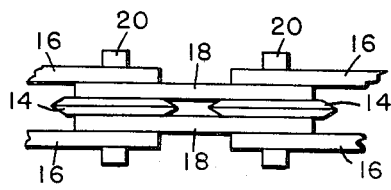
Fig. 2 is a fragmentary plan view of a section of a cutter chain as shown in Fig. 1.

Referring more particularly to the drawing, in Fig. 1 there is illustrated a hydraulic cutter of this invention disposed in operative position about a pipe 10 to be cut. As there shown, the cutter comprises a cutter chain, indicated generally at 12, including a plurality of uniformly-spaced, identical cutting edges or cutters 14, pivotally joined into a flexible, non-extensible chain by a plurality of external links 16 and internal links 18 via transverse pins 20 extending through the links 16 and 18 and cutters 14, and projecting on both sides thereof, as shown in Fig. 2, the repeating of these reference numerals in Figs. 1 and 2 being omitted for clarity. Thus, it will be appreciated that chain 12 is adapted to be tightened around the pipe 10 to be cut and thereby, without rotation or oscillation thereabout, to apply radially-directed, article-cutting pressure at uniformly circumferentially-distributed points in response to application of hydraulic pressure by a hydraulic pressure clamp, especially a hydraulic pressure clamp designated generally by the numeral 22 in Fig. 1.

Figure 4:
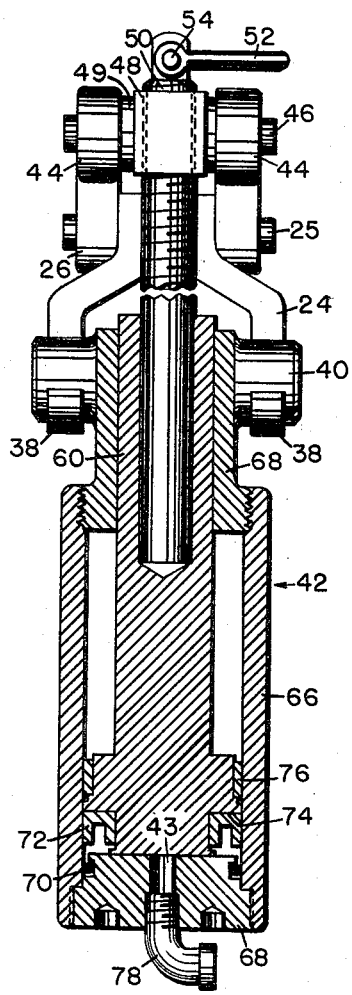
Fig. 4 is an enlarged, fragmentary view, partially in section, of a preferred embodiment of the clamp jaws and hydraulic operating means generally as shown in Fig. 1.

Pivotally connected to one end of cutter chain 12 via pin 20 is a first clamp jaw 24 comprising two similar heavy metal elements of the shape indicated, spaced apart along the common pivot 25 a distance sufficient to fit within two elements of a second clamp jaw 26 also comprising similar elements spaced apart along the pin 25, as better shown in Fig. 4. The second clamp jaw 26, pivotally secured to the first clamp jaw 24 via the common pivot pin 25 intermediate their ends, since it is made up of two spaced apart elements, is provided with an opening for receiving, guiding, and engaging the excess cutter chain beyond that necessary to surround the article 10, as is dictated by the chain length ending at pin 20 retained in a detent 31 in the forward lip 32 of jaw 26. There also are provided two identical detents 33 in jaw 26 which are spaced apart to receive therebetween the cutter chain 12 but to retain a pin 20 via its projection through the chain as shown in Fig. 2. Embodied in the opposite end 38 of jaw 24 is a detent or hook 36 removably receiving a transverse pin 40 of a hydraulic pressure cylinder indicated generally at 42 and shown in more detail in Fig. 4, the ends 38 being bent outwardly and parallel to accommodate therebetween the pin 40 and upper closure element 68. Between the ends 44 of jaw 26 is pivotally secured a transverse pin 46 engaging a nut 48 as better shown in Fig. 4, suitable washer 49 being provided, if desired, on opposite sides of nut 48.

Threadedly engaged in nut 48 is a pin 50, threaded for at least a portion of its length and carrying at its upper end extending upwardly through the nut 48 a pivotally-secured handle 52, secured thereto via pin 54, for turning pin 50 therein.

At its lower end, pin 50 is fitted into the upper end of a piston 60 operatively disposed in cylinder 42 whereby fluid under pressure against surface 43 as from a hydraulic pump designated generally at 62 in fluid connection therewith via hose 64, exerts pressure on pin 50 which thus serves as an extension of piston 60 as shown in Fig. 4 in transmitting pressure pivotally to spread ends 38 and 44 about pin 25 thereby drawing together the opposite ends and tightening the chain 12 about pipe 10.

Referring more particularly to Fig. 4, cylinder 42 comprises a cylindrical shell 66 supporting at its upper end a threadedly engaged closure element 68 bearing the outwardly-extending pin 50. At the lower end, cylinder 66 is provided with a bottom cap 68 threadedly engaged therein. At 70 is provided an O-ring pressure seal. A pressure seal 72 surrounds the lower shoulder of piston 60 and abuts the piston seat 74. A further sliding pressure seal 76 also is provided. Threaded into the bottom cup via a central, or offset, opening is a metal elbow 78 to engage pressure hose not shown in detail but indicated in Fig. 1 at 64.

Figure 5:
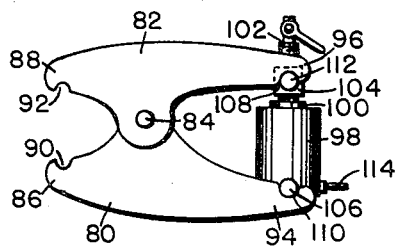
Fig. 5 is a view, similar to Fig. 1, but with parts omitted, for clarity, of another type of clamp jaw embodying the invention wherein the hydraulic operating means is disposed between the clamp jaw elements.

Fig. 5 illustrates another embodiment of the invention wherein jaws 80 and 82, pivotally connected by a pin 84, are adapted at ends 86 and 88 via hooks 90 and 92 to engage a cutter chain as shown in Fig. 1. The opposite ends 94 and 96 accommodate therebetween a hydraulic cylinder 98, similar to 42, provided with a piston 100 and adjusting pin 102, threadedly engaged in a nut 104. Transverse pins 106 and 108 engage hooks 110 and 112 of jaws 80 and 82, respectively. Pressure hose 114 provide entry of fluid under pressure from a pump, e.g., pump 62, whereby ends 94 and 96 are moved apart thus tightening chain engaged by ends 86 and 88.

Figure 3:
Fig. 3 is a view of another cutter element of this invention.

Fig. 3 illustrates a form of cutter chain, cutter element 14¹ adapted to be substituted wholly or in part for cutters 14 as shown in Figs. 1 and 2. Cutters 14¹ are preferred in cutting of large diameter pipe. The cutter jaws and jaw elements shown in Figs. 2, 3, 4 and 5 are intended, of course, to be employed in combination with the other apparatus elements as illustrated in Fig. 1.

The various cutters and other apparatus elements described herein may be formed of suitable metal, alloy, or other high strength material capable of transmitting pressure to the pipe or other article to be cut without cracking, shattering or too rapid dulling. Illustrative of suitable materials are various high strength steels including high carbon steels and low or medium carbon steels. It will be understood, of course, that as a practical matter, the particular steel employed in forming the cutters and cutting edges is dictated by a consideration of the hardness, brittleness, availability, etc. The angle included between the surfaces defining a cutting edge generally may be varied also, a typically preferred angle being about 45°.

If desired, tension springs can be secured between the ends 44 and 38 of the jaws 24 and 26 or between ends 94 and 96 of jaws 80 and 82 to facilitate opening of the jaws when hydraulic pressure is released. It will be understood, of course, that in operation, the application of hydraulic pressure is continued until the article to be cut is severed at which time an appropriate pressure release valve on the pump can be opened to permit return of the hydraulic fluid to the pump reservoir.

What is claimed is:

1. Apparatus for parting an elongated fracturable member comprising, in combination, a flexible non-extensible cutter chain adapted, while substantially stationary with respect to said elongated fracturable member, to effect parting thereof when disposed thereabout via application of squeeze pressure, said cutter chain comprising a series of peripherally spaced cutter means, said cutter means including at least a first terminal cutter means and a selectable second cutter means, clamp means having first and second clamp jaw means, said first clamp jaw means having engagement means thereon to engage said first terminal cutter means, said second clamp jaw means having engagement means thereon to engage said selectable second terminal cutter means, hydraulic means comprising cylinder and piston elements forming a fluid chamber, first means to make engagement between one of said elements and one of said jaw means, second means including adjustable means to make engagement between the other of said elements and the other of said jaw means, means to deliver fluid under pressure to said fluid chamber to move said clamp jaw means relative toward each other and draw said cutter chain tightly around said elongated fracturable member for parting same, said adjustable means comprising a nut and a rod having first and second end portions, said first end portion having threads threadably engaging the nut, means connecting said nut to said other of said jaw means, and turnable means connecting said second end portion of said rod to said other of said elements.

2. Apparatus for parting an elongated fracturable member comprising, in combination, a flexible non-extensible cutter chain adapted, while substantially stationary with respect to said elongated fracturable member, to effect parting thereof when disposed thereabout via application of squeeze pressure, said cutter chain comprising a series of peripherally spaced cutter means, said cutter means including at least a first terminal cutter means and a selectable second terminal cutter means, pivotally mounted clamp means comprising a pair of lever means each having first and second end portions and pivot means interconnecting said lever means together intermediate their end portions, said first end portion of said lever means comprising clamp jaw means and said second end portions of said lever means comprising power actuated portions, one of said clamp jaw means having engagement means thereon to engage said first terminal cutter means, said other clamp jaw means having engagement means thereon to engage said selectable second terminal cutter means, hydraulic means comprising cylinder and piston elements forming a fluid chamber, first means to make engagement between one of said elements and one of said power actuated portions, second means including adjustable means to make engagement between the other of said elements and the other of said power actuated portions, means to deliver fluid under pressure to said fluid chamber to move said clamp jaw means relative toward each other and draw said cutter chain tightly around said elongated fracturable member for parting same, said adjustable means comprising a nut and a rod having first and second end portions, said first end portion having threads threadably engaging the nut, means connecting said nut to said other of said power actuated portions and turnable means connecting said second end portion of said rod to said other of said elements.

3. Apparatus for parting an elongated fracturable member comprising, in combination, a flexible non-extensible cutter chain adapted, while substantially stationary with respect to said elongated fracturable member, to effect parting thereof when disposed thereabout via application of squeeze pressure, said cutter chain comprising a series of peripherally spaced cutter means, said cutter means including at least a first terminal cutter means and a selectable second cutter means, clamp means having first and second clamp jaw means, said first clamp jaw means having engagement means thereon to engage said first terminal cutter means, said second clamp jaw means having engagement means thereon to engage said selectable second terminal cutter means, hydraulic means comprising first and second elements forming a fluid chamber, first connection means to make connection between one of said elements and said first jaw means, second connection means to make connection between the other of said elements and said second jaw means, means to deliver fluid under pressure to said fluid chamber to move said second jaw means relatively toward each other and draw said chain tightly around said elongated fracturable member for parting same, one of said connection means including adjustable means comprising a nut member and a threaded member engaging said nut member with one of said members connected to one of said jaw means and the other of said members connected to one of said elements, said one of said connection means including engageable parts relatively turnable with respect to each other.

References Cited in the file of this patent

UNITED STATES PATENTS

| | | |
|---|---|---|
| 596,066 | Helwig | Dec. 28, 1897 |
| 1,665,212 | La Motte | Apr. 10, 1928 |
| 2,257,245 | Rudolph | Sept. 30, 1941 |
| 2,568,280 | Frost | Sept. 18, 1951 |
| 2,613,437 | McPhee | Oct. 14, 1952 |
| 2,711,583 | Raby | June 28, 1955 |
| 2,793,433 | Wheeler | May 28, 1957 |
| 2,798,288 | Wheeler | July 9, 1957 |
| 2,823,454 | Kirchner | Feb. 18, 1958 |
| 2,833,034 | Wheeler | Feb. 18, 1958 |
| 2,851,773 | Jennison | Sept. 16, 1958 |
| 2,862,295 | Harding et al. | Dec. 2, 1958 |

FOREIGN PATENTS

| | | |
|---|---|---|
| 687 | Great Britain | of 1896 |
| 21,822 | Great Britain | of 1906 |